United States Patent [19]

Unterborn et al.

[11] Patent Number: 5,062,176
[45] Date of Patent: Nov. 5, 1991

[54] WIPER WITH SELF COMPENSATING BLADE PARK POSITION

[75] Inventors: Ralph J. Unterborn; Michael J. McClain, both of Dayton; Mark M. Benner, Xenia, all of Ohio

[73] Assignee: General Motors Corporation, Detroit, Mich.

[21] Appl. No.: 683,906

[22] Filed: Apr. 11, 1991

[51] Int. Cl.5 .......................... B60S 1/44; B60S 1/40
[52] U.S. Cl. .............................. 15/250.23; 15/250.16; 15/250.13; 74/411
[58] Field of Search .......... 15/250.16, 250.23, 250.32, 15/250.13, 250 A, 250.35; 74/411, 406

[56] References Cited

U.S. PATENT DOCUMENTS

| | | | |
|---|---|---|---|
| 1,694,245 | 12/1928 | Baker et al. | 15/250.23 |
| 2,644,187 | 7/1953 | Lacy | 15/250.23 |
| 3,453,679 | 7/1969 | Thorlakson | 15/250.16 |
| 3,660,862 | 5/1972 | Scinta | 15/250.23 |
| 3,818,535 | 6/1974 | Ito | 15/250.23 |
| 4,707,876 | 11/1987 | Carducci | 15/250.23 |
| 4,765,018 | 8/1988 | Buchanan, Jr. | 25/250.13 |
| 4,935,983 | 6/1990 | Yamamoto et al. | 15/250.16 |

FOREIGN PATENT DOCUMENTS

| | | | |
|---|---|---|---|
| 2239643 | 3/1973 | Fed. Rep. of Germany | 15/250.23 |
| 2305239 | 8/1973 | Fed. Rep. of Germany | 15/250.23 |
| 415181 | 10/1975 | Fed. Rep. of Germany | 15/250.23 |
| 2513273 | 10/1976 | Fed. Rep. of Germany | 15/250.23 |
| 1011618 | 4/1952 | France | 15/250.23 |
| 1517083 | 3/1968 | France | 15/250.23 |
| 2362029 | 4/1978 | France | 15/250.23 |
| 435099 | 5/1948 | Italy | 15/250.23 |
| 512138 | 8/1939 | United Kingdom | 15/250.23 |
| 612614 | 11/1948 | United Kingdom | 15/250.32 |
| 624150 | 5/1949 | United Kingdom | 15/250.23 |
| 772971 | 4/1957 | United Kingdom | 15/250.23 |
| 1386581 | 3/1975 | United Kingdom | 15/250.23 |
| 8101271 | 5/1981 | World Int. Prop. O. | 15/250.32 |

Primary Examiner—Harvey C. Hornsby
Assistant Examiner—Gary K. Graham
Attorney, Agent, or Firm—Patrick M. Griffin

[57] ABSTRACT

A wiper blade support is joined to a wiper arm by a yielding mechanism that maintains the two in a fixed angular relation during normal wipe, but which yields to allow the wiper blade to move more closely parallel to the windshield lower edge at park. The yielding mechanism includes a leaf spring indirectly joined between the wiper arm and blade support which buckles only when the wiper blade hits the lower edge of the windshield, allowing the compensating blade rotation, but remains flat during normal wipe.

2 Claims, 2 Drawing Sheets

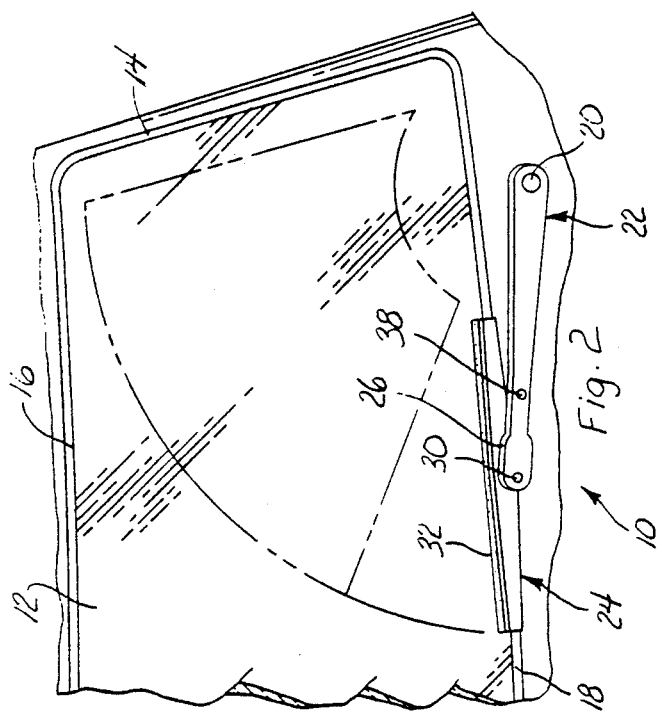
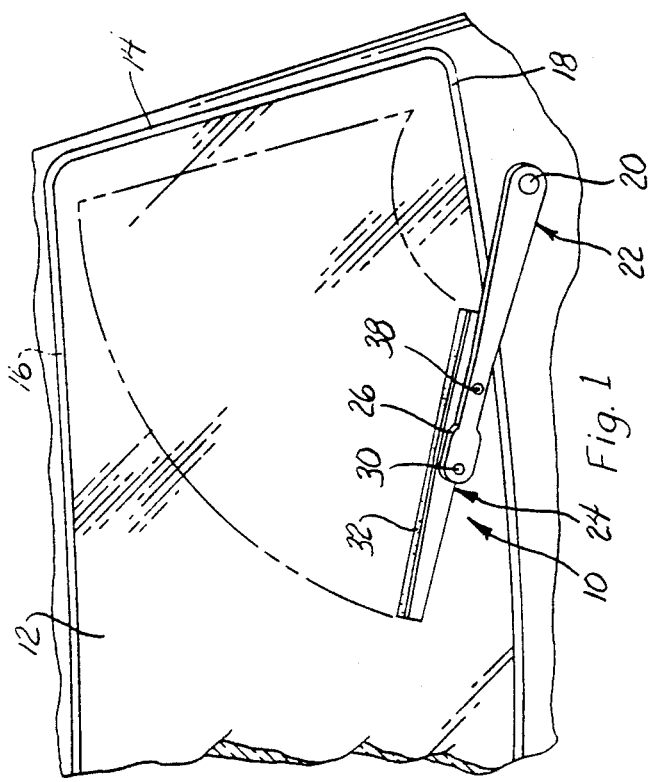
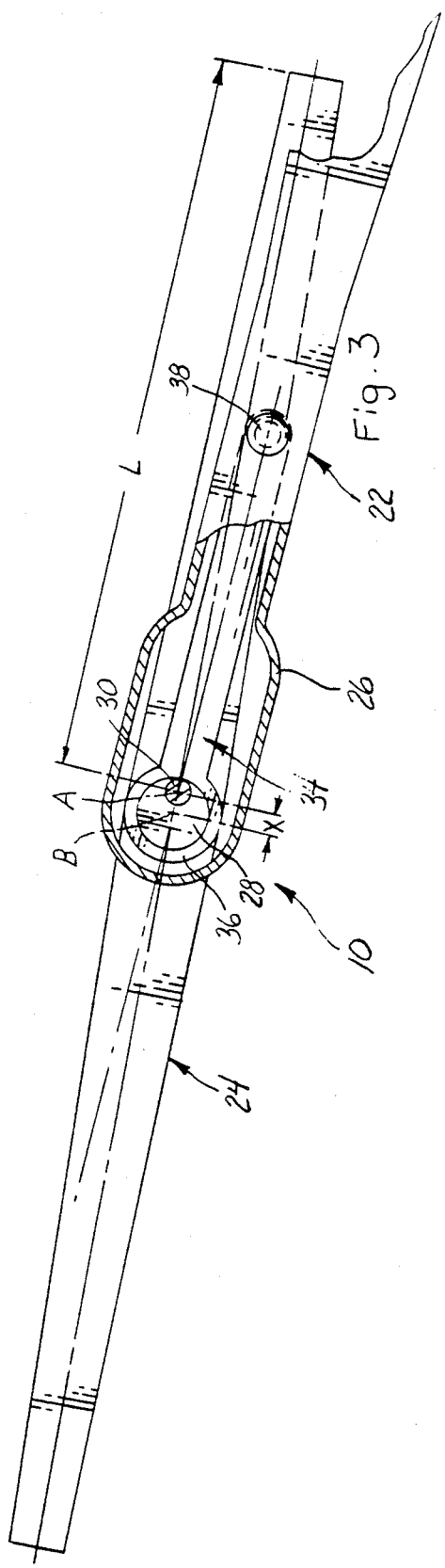

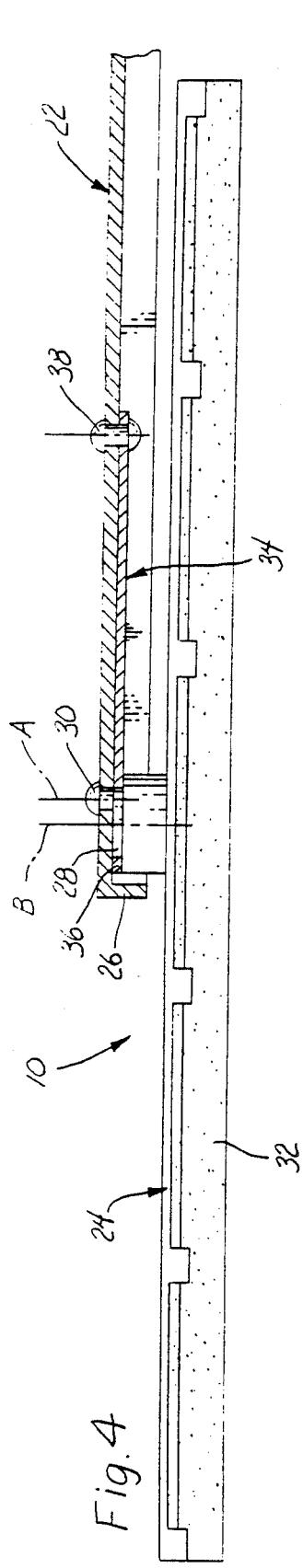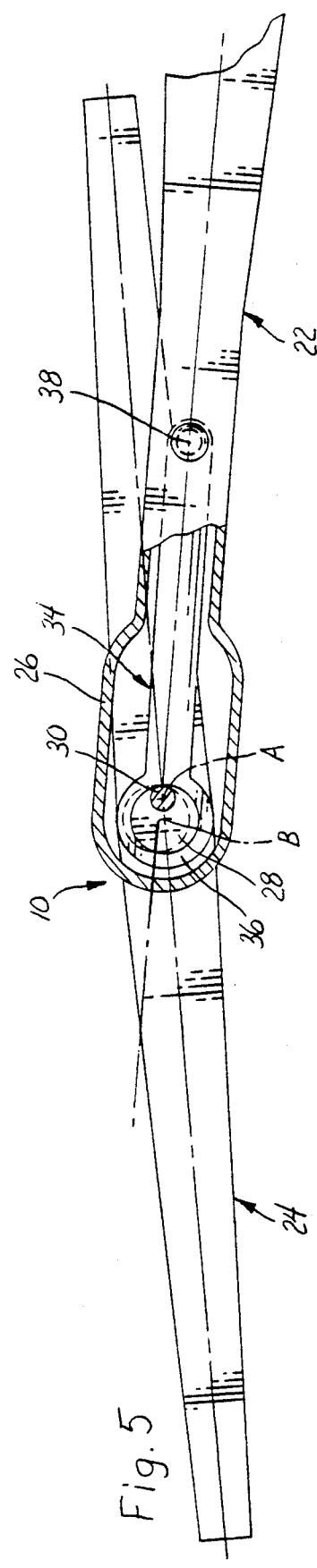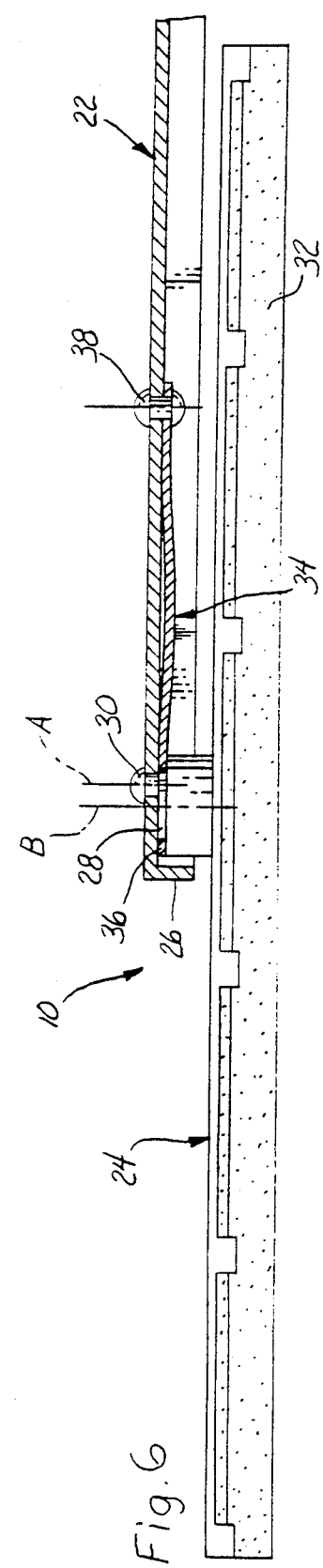

WIPER WITH SELF COMPENSATING BLADE PARK POSITION

This invention relates to vehicle wipers in general, and specifically to a wiper in which the angular position of the blade relative to the arm automatically adjusts to allow the wiper blade to more closely match the location of the lower edge of the windshield when the wiper moves to a depressed park position.

BACKGROUND OF THE INVENTION

With certain windshield geometrics, it is not possible for a wiper blade that maintains a fixed angular position relative to the wiper arm to closely match the windshield edges at both the outer and inner limits of the normal wipe pattern. If the wiper is arranged so that the blade matches the side edge of the windshield at outwipe, it will not be parallel to the lower edge of the windshield at inwipe. With a fixed blade-arm geometry, the closest that the wiper blade can come to the lower edge at inwipe will be the point where the inner end of the wiper blade support begins to hit. If it is desired to park the wiper lower than that when the wiper system is turned off, then the wiper blade support will have to be able to change its angular position relative to the wiper arm as the wiper arm rotates farther down.

Drag link mechanisms are known that will change the angular position of the wiper blade support relative to the arm, either continuously, or at the wipe pattern limits. Such mechanisms are often considered unsuitable for passenger cars, because of the very visible extra link, and are typically found only on commercial vehicles. Another known means for allowing the wiper blade to change its angular position as the wiper parks is a coil or tension spring that allows the wiper blade to pivot on the wiper arm when the blade is forced into the lower edge of the windshield molding at park. This is more compact and less visually objectionable than a drag link mechanism. However, such a spring mechanism must be made quite strong in order to not yield appreciably just from the blade friction experienced during normal wiping. Consequently, a good deal of torque must be applied at park to compress the spring, and the wiper mechanism is subjected to that force continually when the wiper is parked.

SUMMARY OF THE INVENTION

The invention provides a means that allows the wiper blade support to change its angular position relative to the wiper arm as it parks, but which is not subject to yielding during the rest of the wiping cycle. Instead of a continuously variable spring means, the invention uses a buckling member that yields in discontinuous, quantum fashion.

The preferred embodiment disclosed is particularly compact and visually unobtrusive. The wiper blade support sits beneath the wiper arm, attached by a pivot pin that allows the support to rotate about a main axis. The two are prevented from relatively rotating during normal wipe by a flat leaf spring. The outer end of the leaf spring is formed with a circular loop that fits over a circular boss on the wiper blade support, which is offset from and outboard of the main axis. The inner end of the leaf spring is riveted to the wiper arm, inboard of the pivot pin. Any force that tends to rotate the blade support about the main axis also tends to swing the boss about the main axis, and thereby tends to shorten the leaf spring. Unless the buckling threshold of the leaf spring is exceeded, it stays flat, and prevents the arm and blade support from relatively rotating.

Blade friction experienced during the normal wipe cycle does not put enough force on the blade support to buckle the leaf spring. As the wiper arm moves toward park position, however, the blade support hits the lower edge of the windshield, which does create enough force to buckle the spring. This allows the wiper blade support to pivot to an orientation more parallel to the windshield lower edge. The force necessary to maintain the leaf spring buckled is less than the threshold force necessary to buckle it initially, so the wiper system is subject to less stress while it is parked. When the wiper arm moves up and out of park, the leaf spring can flatten out again and return the wiper blade support to its original fixed angular position.

It is, therefore, a general object of the invention to provide a simple and visually unobtrusive wiper in which the wiper blade can pivot relative to the wiper arm as the wiper arm moves down to a depressed park position.

It is another object of the invention to provide such a wiper in which the yielding mechanism that allows the wiper blade support to pivot responds in a discontinuous fashion, so as not to yield just from the normal windshield frictional forces experienced during wiping.

It is another object of the invention to provide such a yielding mechanism in the form of a buckling spring which remains flat during normal wiping, and buckles only when the wiper blade support hits a stop member as it moves down to park position.

It is still another object of the invention to provide a buckling spring connected at one end by a fixed rivet to wiper arm and at the other end by a loop fitted around an eccentrically mounted boss on the wiper blade support, so that rotation of the wiper blade support relative about a main axis causes the boss to swing around the same axis, shortening and buckling the spring.

DESCRIPTION OF THE PREFERRED EMBODIMENT

These and other objects and features of the invention will appear from the following written description, and from the drawings, in which:

FIG. 1 is a view of the driver's side of a vehicle windshield showing a preferred embodiment of a wiper arm and blade made according to the invention, and showing the normal wipe pattern in dotted lines;

FIG. 2 is a view like FIG. 1, but showing the depressed park position below the normal inwipe position;

FIG. 3 is a view of just the wiper arm and blade in their normal, fixed angular position, with a portion of the wiper arm broken away to reveal additional structure;

FIG. 4 is a side view of the wiper arm and blade in their normal relative position, showing the end of the arm in cross section;

FIG. 5 is a view like FIG. 3, but showing the wiper arm and blade pivoted relative to one another, as they would be when parked;

FIG. 6 is a view like FIG. 4, but showing the pivoted position, as well.

Referring first to FIGS. 1 and 2, a preferred embodiment of the invention, indicated generally at 10, is incorporated in a vehicle with a windshield 12. Windshield 12 is bounded by a pair of side edges that correspond to its width, one of which is indicated at 14, and a pair of edges that correspond to its length, upper and lower edges 16 and 18, respectively. Edges 14, 16 and 18 do not constitute part of the windshield 12 as such, consisting instead of surrounding raised moldings or the like, which the wiper 10 will hit if moved far enough. Here, and in most vehicles, the wipers are mounted below the lower edge 18, although they could be mounted above the upper edge 16. The side edge 14 and lower edge 18 create an angle or arc that defines an ideal outwipe and inwipe limit for wiper 10. However, as a practical matter, the wiper post 20 about which wiper 10 sweeps cannot be located at the correct point for generating that ideal wipe pattern. As a consequence, either the outwipe position can be chosen to be substantially parallel to the side edge 14, or the inwipe position can be substantially parallel to the lower edge 18, but not both. Here, the outwipe position is chosen to be close to the side edge 14. The normal inwipe position is consequently not parallel to the lower edge 18, but forms a significant angle therewith, as shown in FIG. 1. This inwipe position is adequate in terms of how much of the windshield 12 is covered during normal wipe, the so called "legal" wipe area. However, for aesthetic and wind noise reasons, such a high inwipe position is considered unsuitable for the so called depressed park position, shown in FIG. 2. At park, wiper 10 is lowered forcefully by a suitable conventional park mechanism, in response to the wiper system being turned off.

Referring next to FIGS. 3 and 4, wiper 10 is constructed so as to achieve the ideal park position, close to and substantially parallel to lower edge 18. This is accomplished through a special buckling mechanism that joins the wiper arm, indicated generally at 22, to the wiper blade support, indicated generally at 24. Wiper arm 22 is a substantially straight and rigid metal member, stamped as a hollow beam with a generally U shaped cross section. The inner end of arm 22 is fixed to wiper post 20, while its outer end is enlarged slightly to create a housing 26. Wiper blade support 24 is also substantially straight and rigid, at least as measured in a plane parallel to the plane of windshield 12, and is stamped from a resilient, flat steel stock. Near the center of blade support 24 is a short cylindrical rod, small enough to fit with clearance within housing 26, which has a circular boss 28 machined at the top. A pivot pin 30 running through the top wall of housing 26 and into boss 28 directly joins blade support 24 to arm 22, beneath arm 22. Blade support 24 also holds a conventional wiper blade 32. Pin 30 is spaced from the inner end of blade support 24 by a distance L, and its main central axis, labeled A, is generally eccentric relative to the secondary central axis of boss 28, labeled B. Specifically, axis A is inboard of axis B, offset by the distance labeled X. Pin 30 alone would allow blade support 24 to pivot freely relative to arm 22, which would cause boss 28 and axis B to swing about axis A. However, blade support 24 and blade 32 have to be maintained in a fixed angular relation to arm 22 in order to operate properly during the normal wipe cycle. This is achieved by additional structure, described next Still referring to FIGS. 3 and 4, a buckling leaf spring, indicated generally at 34, is stamped from resilient, thin spring steel stock, with a length about a third of arm 22 and a width less than arm 22. Spring 34 has an enlarged annular loop 36 at its outer end that fits closely around circular boss 28 and an inner end that is fixed by a rivet 38 to wiper arm 22, inboard of pivot pin 30. The order of assembly would be to put loop 36 over boss 28, capturing the outer end of spring 34, before pin 30 is added. Then, blade support 24 would be turned to the relative angular orientation of FIG. 3, where it forms a slight angle with arm 22, with the axes A and B substantially collinear with arm 22. Then, maintaining that angular orientation, the inner end of spring 34 would be centered within arm 22 and rivet 38 added. As seen in FIG. 4, there is enough vertical clearance between blade support 24 and arm 22 for the necessary tool access to add rivet 38. When spring 34 is so attached, it is essentially invisible, and runs flat between arm 22 and blade support 24.

Referring next to FIGS. 1, 2, 5 and 6, the operation of wiper 10 is illustrated. In its flat, unstressed state, spring 34 will maintain arm 22 and blade support 24 in their fixed angular position. This is because any attempt to rotate blade support 24 about pin 30, as it tended swing axis B about axis A, would also tend to move the captured loop 36 closer to the rivet 38. Unless spring 34 buckles to allow that to occur, arm 22 and blade support 24 cannot rotate out of the fixed position. When arm 22 moves to the normal inwipe position of FIG. 1, the inner end of blade support 24 moves close to, or just touches, the windshield lower edge 18, but does not see any significant force from the contact. Spring 34 is chosen to be strong enough so that, during normal wiping, the frictional force of windshield 12 on blade 32 does not create enough torque about pin 30 to exceed the threshold that will buckle spring 34. Therefore, arm 22 and blade support 24 remain relatively fixed. When arm 22 is moved to the depressed park position of FIG. 2, however, the inner end of blade support 24 is forced into lower edge 18. The force with which the park mechanism drives the inner end of blade support 24 into windshield lower edge 18 is sufficient to exceed the buckling threshold of spring 34, especially as it acts through both the lever arms L and X. As spring 34 buckles, it moves down in the middle, as shown in FIG. 6, within the available vertical clearance. The buckling and shortening of spring 34 occurs as secondary axis B swings about main axis A, as shown in FIG. 5, which indicates the original position of boss 28 by the dotted line. Simultaneously, the spring loop 36 moves toward the rivet 38, shortening spring 34. Thus, the loop 36-boss 28 interconnection is in effect a hybrid rotating and sliding mechanism, with characteristics of each. As boss 28 and loop 36 swing around, the other end of spring 34 can twist on rivet 38 to an extent to compensate. The buckling of spring 34 allows blade support 24 to pivot counterclockwise about pin 30, out of its fixed angular position, and move closer to and more parallel to lower edge 18. When wiper arm 22 is again raised from the park position, spring 34 flattens out, and forces blade support 24 back to its original position.

Numerous advantages flow from the use of spring 34 as disclosed. The aesthetic and packaging advantages are clear. Wiper 10 does not look significantly different than a conventional fixed blade assembly, but for the enlarged housing 26 of arm 22, which is not bulky. Boss 28 and spring 34 both fit neatly and non visibly within available or otherwise unused space, and are also environmentally protected. The greatest advantage is operational, however, and arises from the fact that spring 34 responds non-linearly or discontinuously as it buckles. This as opposed to the continuous stretching or winding up of a linear spring. A linearly responding spring that was strong enough not to give in response to the normal frictional forces of blade support 24 would be quite strong. A linear spring would create a reaction force proportional to the degree of arm rotation necessary to achieve park. That reaction force would continue to stress the wiper linkage during the entire time that the wiper system was turned off. Spring 34, on the other hand, once its buckling threshold is exceeded, resists further buckling less forcefully, and stresses the system less thereafter.

Variations of the preferred embodiment could be made. Broadly speaking, the invention operates by virtue of a rotational connection between arm and blade that has a main axis, acting in conjunction with a buckling member having an inner end fixed to the arm, and an outer end connected to the blade support by a sliding and rotating mechanism the secondary axis of which is located eccentrically relative to the main axis. This causes the outer end of the spring to swing toward the fixed end and buckle the spring when the blade support pivots about the main axis. Another such hybrid mechanism could be devised, such as a flat spring that had its inner end rivet to the arm as disclosed, but its outer end abutted closely with a cam on the blade support that had a rocking axis offset from the main pivot axis. As the blade support pivoted on the main axis, the cam would rock around its offset axis and push the two ends of the spring closer together. A buckling member like spring 34 could be located above the arm 22 and buckle up, rather than down. Locating the mechanism inside the hollow beam of arm 22 provides the aesthetic and environmental advantages noted, however. A stop member other than lower edge 18 could be provided to hit blade support 24 and rotate it. Therefore, it will be understood that it is not intended to limit the invention to just the embodiment disclosed.

The embodiments of the invention in which an exclusive property or privilege is claimed are defined as follows:

1. A wiper for use on a vehicle having a windshield with a pair of edges that define ideal wipe pattern limits of an ideal wipe pattern in which one of two normal wipe pattern limits, in a normal wipe pattern located within said ideal wipe pattern, is not substantially parallel to one of the windshield edges, said vehicle also having a park mechanism adapted to move said wiper forcefully to a park position beyond said one normal wipe pattern limit, said wiper comprising, an elongated wiper arm, pivoted at one end to a wiper post, adapted to be oscillated over said windshield through said normal wipe pattern, a wiper blade and support pivoted to said wiper arm so as to rotate relative thereto about a main axis and to wipe said windshield when maintained in a fixed angular relationship to said wiper arm, and, an elongated buckling member having an outer end rotatably joined to said blade support about a secondary axis located outwardly, with respect to said wiper post, of said main axis, so that rotation of said wiper blade support about said main axis causes said secondary axis to swing about said main axis, said buckling member also having an inner end fixed to said wiper arm inwardly, with respect to said wiper post, of said main axis so as to maintain said wiper arm and blade support in said fixed angular relationship when said buckling member is in a flat, unstressed condition, and, a stop member engageable with said wiper blade support when said wiper is moved to said park position so as to apply a torque to said wiper blade support about said main axis sufficient to swing said secondary axis about said main axis and move said buckling member outer and inner ends together to buckle said buckling member out of its flat condition, whereby, when said wiper arm is moved to said park position, said blade support can rotate out of said fixed angular relationship and move substantially parallel to said one windshield edge, said buckling member returning to its unstressed condition as said wiper arm is again moved away from park position, thereby rotating said wiper blade support back to its fixed angular position.

2. A wiper for use on a vehicle having a windshield with a pair of edges that define ideal wipe pattern limits of an ideal wipe pattern, in which one of two normal wipe pattern limits in a normal wipe pattern located within said ideal wipe pattern, is not substantially parallel to one of the ideal wipe pattern limits, said vehicle also having a park mechanism adapted to move said wiper forcefully to a park position beyond said one normal wipe pattern limit, said wiper comprising, an elongated wiper arm, pivoted at one end to a wiper post, adapted to be oscillated over said windshield through said normal wipe pattern, a wiper blade and support pivotally attached to said wiper arm so as to wipe said windshield when said support and arm are maintained in a fixed angular relationship, a circular boss on said wiper blade support having a central axis, a pivot, defining a pivot axis, and joining said circular boss to said wiper arm inwardly, with respect to said wiper post, of said boss central axis so that, when said wiper blade support and wiper arm rotate about said pivot axis, the central axis of said boss swings around said pivot axis, an elongated buckling leaf spring having an annular outer end that fits cooperatively around said wiper support boss and an inner end fixed to said wiper arm such that, when said leaf spring is flat and unstressed, said wiper arm and wiper blade support are maintained in a fixed angular relationship, and, a stop member engageable with said wiper blade support when said wiper is moved to said park position so as to apply a torque to said wiper blade support about said pivot sufficient to buckle said leaf spring, whereby, when said wiper arm is moved to said park position, said blade support hits said stop member, thereby applying sufficient torque about said pivot to rotate said wiper blade support on said pivot and move substantially parallel to said one windshield edge as the central axis of said boss swings about said pivot axis and moves closer to the fixed end of said leaf spring and buckles said leaf spring out of its flat state, said leaf spring returning to its unstressed condition as said wiper arm is again moved away from said park position, thereby rotating said wiper blade support back to its fixed angular position.

* * * * *